United States Patent
Dasilva et al.

(10) Patent No.: US 7,653,994 B2
(45) Date of Patent: Feb. 2, 2010

(54) REPAIR OF HPT SHROUDS WITH SINTERED PREFORMS

(75) Inventors: Paul A. Dasilva, West Chester, OH (US);
David E. Budinger, Loveland, OH (US);
Jeffrey J. Reverman, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 440 days.

(21) Appl. No.: 11/386,127

(22) Filed: Mar. 22, 2006

(65) Prior Publication Data

US 2007/0220748 A1 Sep. 27, 2007

(51) Int. Cl.
B23P 6/00 (2006.01)
B23K 31/00 (2006.01)
(52) U.S. Cl. ............... 29/889.1; 29/402.09; 29/402.16; 228/119
(58) Field of Classification Search ............... 29/889.1, 29/402.01, 402.09, 402.12, 402.16, 402.18; 419/52, 36, 6; 228/119
See application file for complete search history.

(56) References Cited

U.S. PATENT DOCUMENTS

| 4,155,152 | A |   | 5/1979  | Cretella et al. |
|-----------|---|---|---------|-----------------|
| 4,822,248 | A |   | 4/1989  | Wertz et al. |
| 4,842,953 | A |   | 6/1989  | Perkins et al. |
| 4,937,042 | A |   | 6/1990  | Perkins et al. |
| 5,071,054 | A |   | 12/1991 | Dzugan et al. |
| 5,561,827 | A |   | 10/1996 | Reeves et al. |
| 5,575,145 | A |   | 11/1996 | O'Neill et al. |
| 5,705,281 | A |   | 1/1998  | Reeves et al. |
| 5,822,852 | A |   | 10/1998 | Bewlay et al. |
| 5,883,314 | A | * | 3/1999  | Sievers et al. ................. 75/230 |
| 5,956,845 | A |   | 9/1999  | Arnold |
| 6,049,978 | A |   | 4/2000  | Arnold |
| 6,269,540 | B1 |  | 8/2001  | Islam et al. |
| 6,283,356 | B1 |  | 9/2001  | Messelling |
| 6,333,822 | B1 |  | 12/2001 | Ohtake et al. |
| 6,391,252 | B1 |  | 5/2002  | David et al. |
| 6,451,454 | B1 | * | 9/2002 | Hasz et al. ................... 428/668 |
| 6,464,128 | B1 |  | 10/2002 | Messelling et al. |
| 6,503,349 | B2 | * | 1/2003 | Pietruska et al. ............ 148/562 |
| 6,560,870 | B2 |  | 5/2003  | Das et al. |
| 6,624,225 | B1 | * | 9/2003 | Ellison et al. ................ 524/434 |
| 7,343,676 | B2 | * | 3/2008 | Ng ............................. 29/889.1 |
| 2003/0033702 | A1 | | 2/2003 | Berry et al. |
| 2003/0088980 | A1 | | 5/2003 | Arnold |
| 2004/0084423 | A1 | | 5/2004 | Grossklaus, Jr. et al. |

(Continued)

FOREIGN PATENT DOCUMENTS

EP 1780377 A2 5/2007

*Primary Examiner*—David P Bryant
*Assistant Examiner*—Ryan J Walters
(74) *Attorney, Agent, or Firm*—McNees Wallace & Nurick, LLC

(57) ABSTRACT

A method for repairing a gas turbine stationary flowpath shroud. The method comprises providing a superalloy gas turbine stationary flowpath shroud that has previously been in service. The method further comprises preparing a restoration coating for application to the flowpath surface of the shroud by the steps of providing a precursor mixture comprising a higher-melting-point alloy component, a lower-melting-point alloy component, and a fugitive binder. A perform is prepared from the components and pre-sintered into a mildly curved form. The partially densified perform is applied to the flowpath surface and thermally bonded to the flowpath surface, forming a restoration coating.

20 Claims, 4 Drawing Sheets

U.S. PATENT DOCUMENTS

2004/0086635 A1 5/2004 Grossklaus, Jr. et al.
2005/0053800 A1 3/2005 Rigney et al.
2005/0100663 A1* 5/2005 Budinger et al. ......... 427/126.1

* cited by examiner

REPAIR OF HPT SHROUDS WITH SINTERED PREFORMS

FIELD OF THE INVENTION

This invention relates to superalloy articles such as used in aircraft gas turbine engines, and, more particularly, to such an article having an abradable, thermally densified coating applied thereto.

BACKGROUND OF THE INVENTION

In an aircraft gas turbine (jet) engine, air is drawn into the front of the engine, compressed by a shaft-mounted compressor, and mixed with fuel. The mixture is combusted, and the resulting hot combustion gas is passed through a turbine mounted on the same shaft. The turbine includes a rotating turbine disk with turbine blades supported on its periphery, and a stationary (that is, not rotating) gas turbine flowpath shroud that confines the combustion gas to flow through the annulus between the turbine disk and the shroud, and thence against the turbine blades. The constrained flow of hot combustion gas turns the turbine by contacting an airfoil portion of the turbine blade, which turns the shaft and provides power to the compressor. The rotating turbine blades and the gas turbine stationary flowpath shroud are heated to high temperatures by the hot combustion gas. To aid them in withstanding the high external temperatures, they are typically cooled by flows of compressed cool air that are conducted through their interiors and exit at cooling holes in their surfaces. The hot exhaust gases flow from the back of the engine, driving it and the aircraft forward.

During service, the turbine disk, the turbine blades, and the gas turbine stationary flowpath shroud are all corroded, eroded, and oxidized by the hot combustion gas, and material is also lost by rubbing. Some of the metal of the turbine blades and the gas turbine stationary flowpath shroud is burned away, reducing the dimensions of the components below that which is acceptable for economic operation of the gas turbine engine. Rotor excursions, due to causes such as power bursts or hard landings, produce rubs between the turbine blades and the shroud that dig into the shroud. Consequently, with increasing periods of service, the clearance gap between the turbine blades and the gas turbine stationary flowpath shroud is increased. Eventually, the efficiency of the gas turbine suffers because hot combustion gas leaks through the clearance gap between the tips of the turbine blades and the gas turbine stationary flowpath shroud and does not perform work to turn the turbine blades.

When the gas turbine engine is overhauled, it is conventional practice to restore the dimensions of the components to within their original manufactured tolerances, thereby regaining the efficiency of the gas turbine. In the case of the gas turbine stationary flowpath shroud, techniques are known to conduct this repair with thermally densified coatings, see for example U.S. Pat. No. 5,561,827, whose disclosure is hereby incorporated by reference in its entirety. In this approach, a preform is prepared and bonded to the flowpath surface of the gas turbine stationary flowpath shroud, and the cooling holes are redrilled. This approach has been successful for restoring the dimensions of the gas turbine stationary flowpath shroud, and, in conjunction with techniques for restoring the turbine blades, for returning the gas turbine to its specification dimensions and thence to its original efficiencies.

However, in some instances of the use with thermally densified coatings, there has been observed insufficient dimensional stability of the thermally densified coatings during processing. There is a need for a repair procedure for the gas turbine stationary flowpath shrouds that is satisfactory in restoring its dimensions, while maintaining dimensional stability during processing. The present invention fulfills this need, and further provides related advantages.

SUMMARY OF THE INVENTION

One embodiment of the present invention is a method for repairing a gas turbine stationary flowpath shroud. The method comprises providing a superalloy gas turbine stationary flowpath shroud that has previously been in service, wherein the superalloy is selected from the group consisting of nickel-base superalloy and cobalt-base superalloy, the shroud comprising a flowpath surface. The method further comprises preparing a restoration coating for application to the flowpath surface of the shroud by the steps of providing a precursor mixture comprising a higher-melting-point alloy component, a lower-melting-point alloy component, and a fugitive binder, forming a mildly curved restoration preform from the precursor mixture, and sintering the restoration preform at a preselected sufficiently high temperature to melt the lower-melting-point alloy component for a preselected period of time sufficient to partially densify the restoration preform and burn off the binder, wherein the sintering takes place on a mildly curved plate. The method further comprises applying a restoration coating to the flowpath surface by the steps of attaching the mildly curved partially densified preform to the flowpath surface, and thermally bonding the mildly curved partially densified preform to the flowpath surface by heating the component with the partially densified preform for a preselected period of time and at a preselected temperature sufficient to form a metallurgical diffusional bond between the partially densified preform and the flowpath surface forming a restoration coating.

Another embodiment of the present invention is also a method for repairing a gas turbine stationary flowpath shroud. The method comprises providing a superalloy gas turbine stationary flowpath shroud that has previously been in service, wherein the superalloy is selected from the group consisting of nickel-base superalloy and cobalt-base superalloy, the shroud comprising a flowpath surface. The method further comprises preparing a restoration coating for application to the flowpath surface of the shroud by the steps of providing a precursor mixture comprising a higher-melting-point alloy component, a lower-melting-point alloy component, and a fugitive binder, and forming a mildly curved restoration preform from the precursor mixture, sintering the restoration preform at a preselected sufficiently high temperature to melt the lower-melting-point alloy component for a preselected period of time sufficient to partially densify the restoration preform and burn off the binder, wherein the sintering takes place on a flat plate, and forming a mildly curved partially densified perform from the flat partially densified perform. The method further comprises applying a restoration coating to the flowpath surface by the steps of attaching the mildly curved partially densified preform to the flowpath surface and thermally bonding the mildly curved partially densified preform to the flowpath surface by heating the component with the partially densified preform for a preselected period of time and at a preselected temperature sufficient to form a metallurgical diffusional bond between the partially densified preform and the flowpath surface forming a restoration coating.

An advantage of the present invention is that use a partially densified preform for the restoration coating results in dimensional stability of the shroud backing during manufacturing.

Another advantage of the present invention is that a repair of a gas turbine stationary flowpath shroud does not result in excessive wetting and excessive migration of the preform material onto other features of the shroud.

Other features and advantages of the present invention will be apparent from the following more detailed description of the preferred embodiment, taken in conjunction with the accompanying lower cost and improved performance drawings which illustrate, by way of example, the principles of the invention.

DETAILED DESCRIPTION OF THE INVENTION

Figure 1:
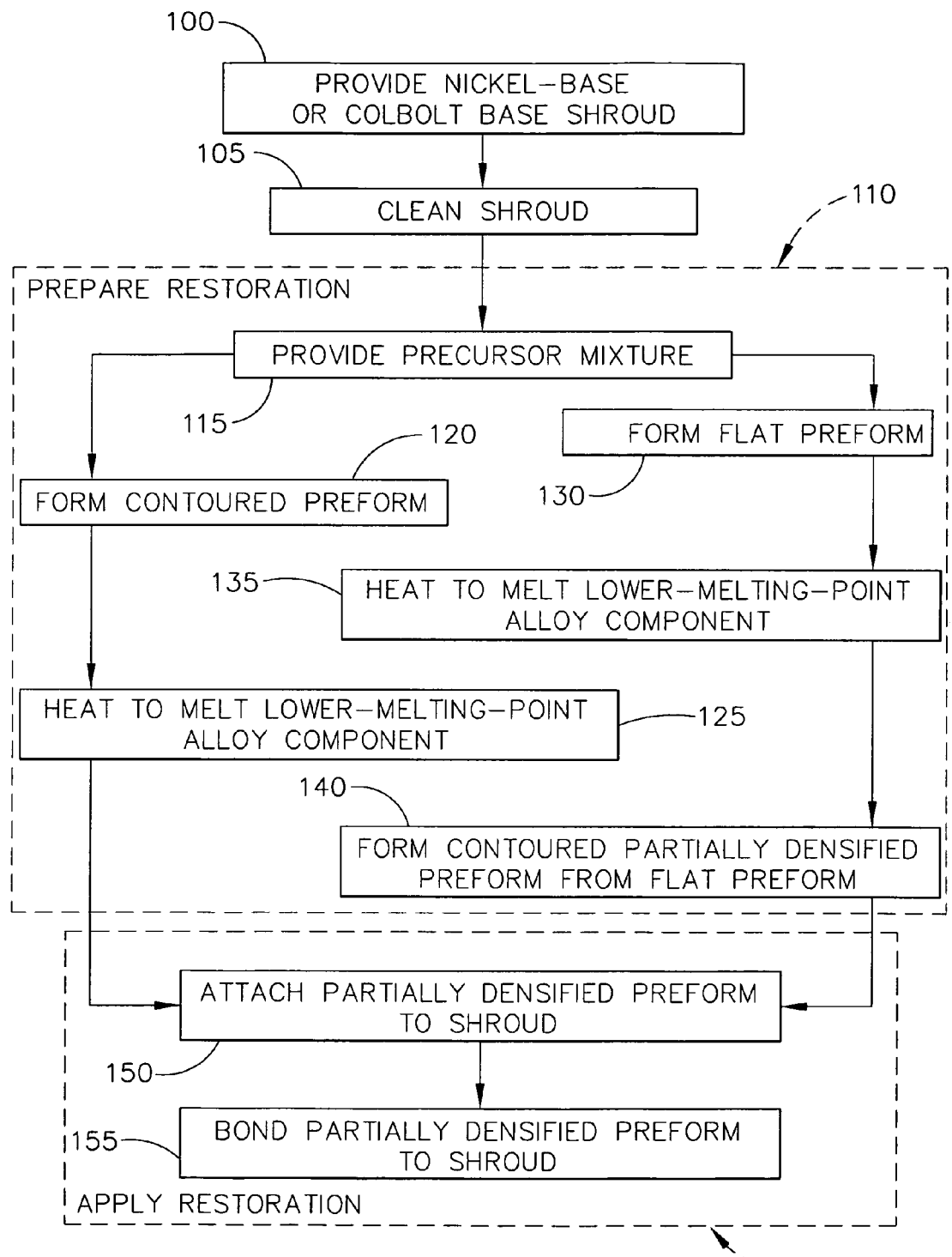
FIG. 1 is a block flow diagram of a preferred approach for practicing an embodiment of the method of the invention.

FIG. 1 depicts in block diagram form embodiments of a method for repairing a nickel-base or cobalt-base superalloy turbine flowpath shroud. In practicing the method, the nickel-base or cobalt-base superalloy turbine flowpath shroud that has previously been in service is provided, step 100. FIGS. 2-7 depict the use of the method in relation to the gas turbine stationary flowpath shroud.

Figure 2:
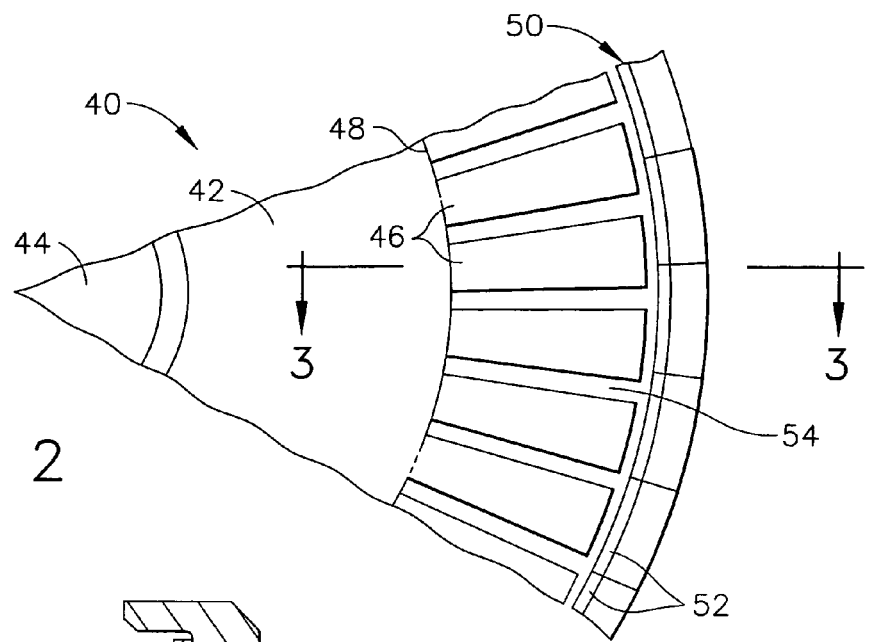
FIG. 2 is a fragmentary schematic front elevational view of a portion of a gas turbine.

FIG. 2 presents a simplified depiction of the relevant portions of a gas turbine 40, illustrating only the components of interest. The gas turbine 40 includes a turbine disk 42 that is fixed to and rotates with a center shaft 44. A plurality of turbine blades 46 extend radially outwardly from a periphery 48 of the turbine disk 42. A gas turbine stationary flowpath shroud 50 forms a tunnel-like structure in which the turbine disk 42, the shaft 44, and the turbine blades 46 rotate. The gas turbine stationary flowpath shroud 50 is termed "stationary" and does not rotate as the turbine disk 42, the shaft 44, and the turbine blades 46 rotate. The stationary gas turbine stationary flowpath shroud 50 is to be distinguished from the rotating shrouds that are found near the tips of some types of gas turbine blades. The gas turbine stationary flowpath shroud 50 is formed by a series of curved stationary shroud segments 52 that together define the cylindrical gas turbine stationary flowpath shroud 50. A combustion gas flow 54 flowing from the combustors (not shown) of the gas turbine engine is perpendicular to the plane of the drawing of FIG. 2.

Figure 3:
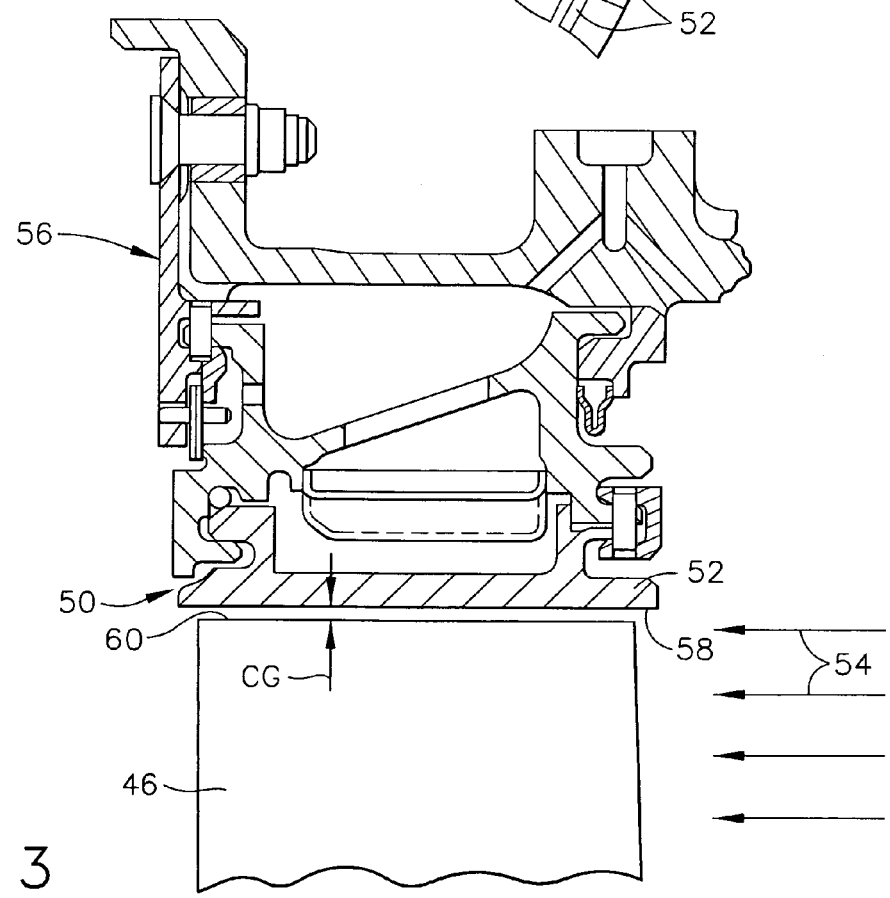
FIG. 3 is a cross-sectional view along line 3-3 of FIG. 2 of a gas turbine stationary flowpath shroud assembly and its relation to a turbine blade.

FIG. 3 illustrates the gas turbine stationary flowpath shroud 50 and one of the stationary shroud segments 52 in greater detail. Each stationary shroud segment 52 is supported on a shroud hanger structure 56. The gas turbine stationary flowpath shroud 50 and the stationary shroud segment 52 have a flowpath surface 58 that faces but is spaced apart from a tip 60 of the turbine blade 46. In the operation of the gas turbine 40, it is important that the separation of the flowpath surface 58 and the tip 60, termed the clearance gap CG, be within specified tolerance limits. During service, both the flowpath surface 58 and the tip 60 are eroded, corroded, and oxidized by the hot combustion gas 54, and occasionally rubbed together with a consequent loss of material. The value of CG therefore increases over time, until it becomes so large that an unacceptable amount of the combustion gas flow 54 leaks between the flowpath surface 58 of the stationary flowpath shroud 50 and the tip 60, so that the combustion gas does not contact the turbine blade 46 and impart energy to it. The result is the loss of efficiency of the gas turbine 40.

Figure 4:
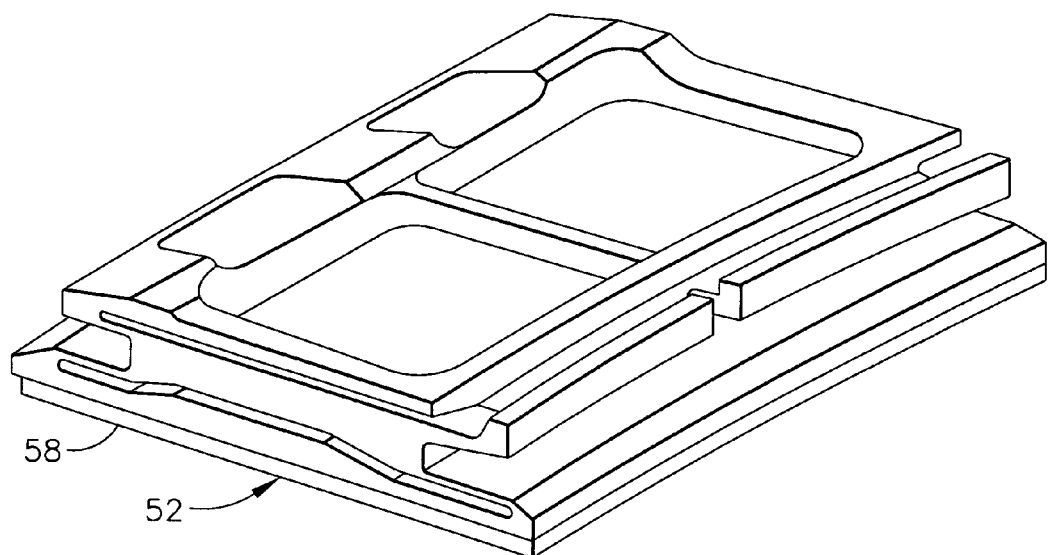
FIG. 4 is a perspective view of a segment of the gas turbine stationary flowpath shroud.
Figure 5:
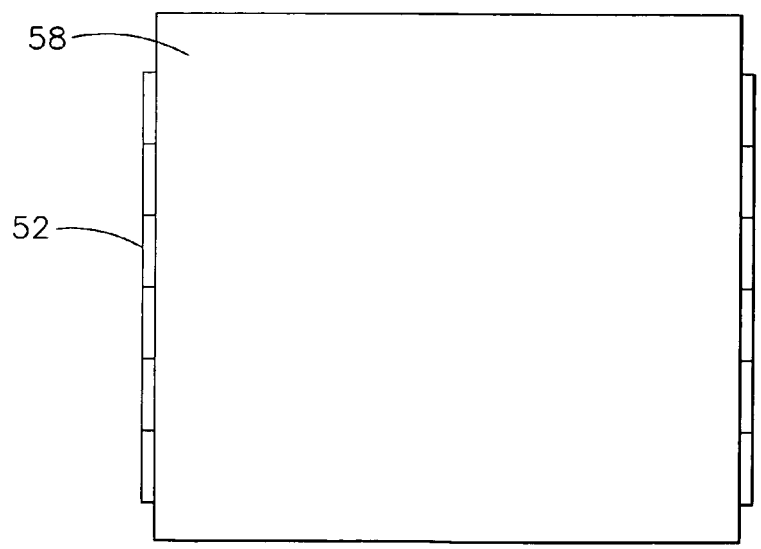
FIG. 5 is a bottom view of the gas turbine stationary flowpath shroud.
Figure 6:
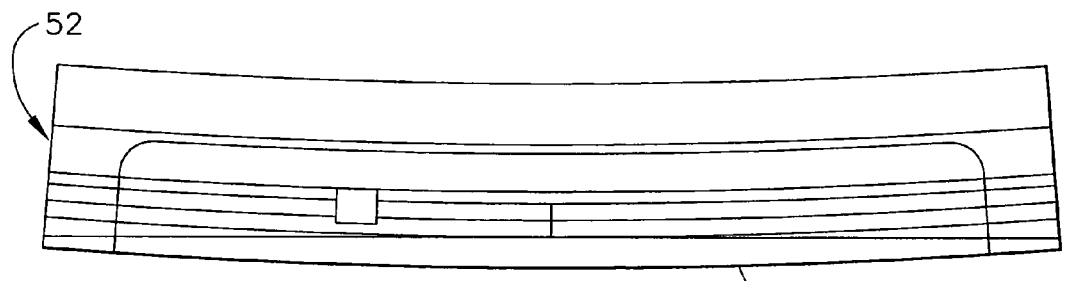
FIG. 6 is a front view of the gas turbine stationary flowpath shroud.

FIG. 4 depicts the side opposite the flowpath surface 58. FIGS. 5-6 illustrate the bottom (FIG. 5) and front elevational (FIG. 6) views. The article such as the gas turbine stationary flowpath shroud 50 is preferably made of a nickel-base superalloy or a cobalt-base superalloy. As used herein, "nickel-base" means that the composition has more nickel present than any other element. The nickel-base superalloys are of a composition that is strengthened by the precipitation of gamma-prime phase or a related phase. In a preferred embodiment, the article comprises Rene N5 alloy, the alloy having a nominal composition, in weight percent, of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, and balance nickel and incidental impurities. As used herein, "cobalt-base" means that the composition has more cobalt present than any other element. In another preferred embodiment, the article comprises MAR-M-509 alloy, the alloy having a composition comprising, in weight percent, chromium in the range of about 23 percent to about 24.25 percent, nickel in the range of about 9 percent to about 11 percent, tungsten in the range of about 6.5 percent to about 7.5 percent, tantalum in the range of about 3 percent to about 4 percent, carbon in the range of about 0.55 percent to about 0.65 percent, zirconium in the range of about 0.3 percent to about 0.5 percent, up to about 2 percent iron, up to about 0.3 percent silicon, up to about 0.1 percent copper, up to about 0.1 percent manganese, up to about 0.015 percent phosphorus, up to about 0.015 percent sulfur, up to about 0.01 percent boron, and balance cobalt and incidental impurities.

The shroud segment 52 that has previously been in service is cleaned to remove dirt, oxidation and corrosion products, and other foreign matter resulting from the prior service, step 105. The cleaning is preferably accomplished by fluoride ion cleaning, as described in U.S. Pat. No. 4,098,450, issued Jul. 4, 1978, entitled, "SUPERALLOY ARTICLE CLEANING AND REPAIR METHOD," and assigned to the assignee of the present invention, which disclosure is hereby incorporated by reference in its entirety.

A restoration coating is prepared, step 110, for application, step 145, to the pre-repair flowpath surface 74, of the stationary shroud segment 52. The step 110 first includes providing a precursor mixture, step 115. The precursor mixture comprises a mix of a higher-melting-point alloy powder component, a lower-melting-point alloy powder component and a fugitive binder. Preferably the powder size of both the lower-melting-point alloy powder and the higher-melting-point powder is about −140/+325 mesh, although other powder sizes may be used for particular applications. The two alloy components are prepared separately, and then mixed together with the fugitive binder, as such fugitive binder is known in the art, to make the precursor mixture. The two alloy powder components are mixed together in a preselected proportion to form the alloy mixture. A fugitive binder is then added to the alloy powder mixture to form the precursor mixture provided in step 115. The binder is preferably an organic material that holds the alloy powders together in a selected shape for initial handling, but later burns away during partial densification, step 135.

In one embodiment wherein the shroud 50 comprises a nickel-base superalloy, the two alloys in the precursor mixture are described in detail in U.S. patent application Ser. No. 10/703,010, filed on Nov. 6, 2003, and entitled "METHOD FOR REPAIR OF A NICKEL-BASE SUPERALLOY ARTICLE USING A THERMALLY DENSIFIED COATING", which is hereby incorporated by reference in its entirety, and which is assigned to the assignee of the present invention. A preferred higher-melting-point alloy component for use with the nickel-base superalloy embodiment of shroud 50 has a nominal composition, in weight percent, of about 3.1 percent cobalt, about 7.6 percent chromium, up to about 0.1 percent molybdenum, about 3.85 percent tungsten, up to about 0.02 percent titanium, about 1.65 percent rhenium, about 0.55 percent silicon, about 5.45 percent tantalum, about 7.8 percent aluminum, about 0.15 percent hafnium, about 0.02 percent carbon, balance nickel and incidental impurities. In another preferred embodiment the higher-melting-point alloy component for use with the nickel-base superalloy embodiment of shroud 50 comprises, in weight percent, about 0.01 percent to about 0.03 percent carbon, up to about 0.1 percent manganese, about 0.5 percent to about 0.6 percent silicon, up to about 0.01 percent phosphorus, up to about 0.004 percent sulfur, about 7.4 percent to about 7.8 percent chromium, about 2.9 percent to about 3.3 percent cobalt, up to about 0.1 percent molybdenum, about 3.7 percent to about 4.0 percent tungsten, about 5.3 percent to about 5.6 percent tantalum, up to about 0.02 percent titanium, about 7.6 percent to about 8.0 percent aluminum, about 1.5 percent to about 1.8 percent rhenium, up to about 0.005 percent selenium, up to about 0.3 percent platinum, about 0.01 percent to about 0.02 percent boron, up to about 0.03 percent zirconium, about 0.12 to about 0.18 percent hafnium, up to about 0.1 percent niobium, up to about 0.1 percent vanadium, up to about 0.1 percent copper, up to about 0.2 percent iron, up to about 0.0035 percent magnesium, up to about 0.01 percent oxygen, up to about 0.01 percent nitrogen, balance nickel with incidental impurities. In a preferred embodiment, the lower-melting-point alloy component for use with the nickel-base superalloy embodiment of shroud 50 comprises, in weight percent, about 14.0 percent to about 16.0 percent cobalt, about 19.0 percent to about 21.0 percent chromium, about 4.5 percent to about 5.5 percent aluminum, up to about 0.05 carbon, about 7.7 percent to about 8.1 percent silicon, up to about 0.5 percent iron, up to about 0.1 percent magnesium, balance nickel and incidental impurities. In a preferred embodiment, the alloy components of the precursor mixture for use with the nickel-base superalloy embodiment of shroud 50 comprise, in weight percent, about 79 percent of the higher-melting-point alloy component and balance the lower-melting-point alloy component.

In one embodiment wherein the shroud 50 comprises a nickel-base superalloy, the alloy components of the precursor mixture, combined, comprise no more than about 15 weight percent chromium, preferably no more than about 12 weight percent chromium, and most preferably about 10 weight percent chromium. In such an embodiment, the alloy components of the precursor mixture, combined, comprise no more than about 0.01 percent yttrium, and preferably substantially no yttrium (i.e., no more than about 0.001 percent). In another preferred embodiment, the alloy components in the precursor mixture for use with the nickel-base superalloy embodiment of shroud 50, combined, have a nominal composition, in weight percent, of about 10.2 percent chromium, about 5.6 percent cobalt, about 7.2 percent aluminum, about 4.3 percent tantalum, about 1.3 percent rhenium, about 3.1 percent tungsten, about 0.1 percent hafnium, about 2.1 percent silicon, substantially no yttrium, balance nickel and impurities.

In an alternate embodiment wherein the shroud 50 comprises a nickel-base superalloy, the two alloys in the precursor mixture are described in detail in U.S. Pat. No. 5,561,827, issued on Oct. 1, 1996, and entitled "COATED NICKEL-BASE SUPERALLOY AND POWDER AND METHOD USEFUL IN ITS PREPARATION", which is hereby incorporated by reference in its entirety, and which is assigned to the assignee of the present invention. A preferred alternate higher-melting-point alloy component for use with the nickel-base superalloy embodiment of shroud 50 has a composition comprising, in weight percent, of about 10 percent to about 20 percent cobalt, about 14 percent to about 25 percent chromium, about 2 percent to about 12 percent aluminum, from 0 to about 0.2 percent yttrium, balance nickel and incidental impurities. A more preferred alternate higher-melting-point alloy component for use with the nickel-base superalloy embodiment of shroud 50 has a composition comprising, in weight percent, of about 14 percent to about 16 percent cobalt, about 19 percent to about 21 percent chromium, about 8.5 percent to about 9.5 percent aluminum, about 0.05 percent to about 0.15 percent yttrium, up to about 0.02 percent boron, up to about 0.05 percent carbon, up to about 0.500 percent iron, up to about 0.0075 percent selenium, up to about 0.1 percent silicon, up to about 0.010 percent phosphorus, up to about 0.010 percent copper, up to about 0.10 magnesium, and balance nickel. A preferred alternate lower-melting-point alloy component for use with the nickel-base superalloy embodiment of shroud 50 has a composition comprising, in weight percent, of about 10 percent to about 20 percent cobalt, about 14 percent to about 25 percent chromium, about 2 to about 12 percent aluminum, about 0.001 percent to about 3 percent boron, about 2 percent to about 12 percent silicon, balance nickel and incidental impurities. A more preferred alternate lower-melting-point alloy component for use with the nickel-base superalloy embodiment of shroud 50 comprises, in weight percent, about 14 percent to about 16 percent cobalt, about 19 percent to about 21 percent chromium, about 4.5 to about 5.5 percent aluminum, about 8 percent silicon, up to about 0.05 percent boron, up to about 0.05 percent carbon, up to about 0.500 percent iron, about 0.0075 percent selenium, up to about 0.010 percent phosphorous, up to about 0.010 percent copper, up to about 0.10 percent magnesium, balance nickel. In an alternate preferred embodiment, the alloy components of the precursor mixture for use with the nickel-base superalloy embodiment of shroud 50, combined, comprise, in weight percent, about 60 percent to about 75 percent of the higher-melting-point alloy component and balance the lower-melting-point alloy component. In a more preferred embodiment, the alloy mixture for use with the nickel-base superalloy embodiment of shroud 50 comprises, in weight percent, about 68.5 percent of the higher-melting-point alloy component and balance the lower-melting-point alloy component.

In an alternate embodiment the alloy components of the precursor mixture, combined, for use with the nickel-base superalloy embodiment of shroud 50 comprise, in weight percent, about 10 percent to about 20 percent cobalt, about 14 percent to about 25 percent chromium, about 2 percent to about 12 percent aluminum, from 0 to about 0.2 percent yttrium, about 0.001 percent to about 3 percent boron, about 1 percent to about 10 percent silicon, and balance nickel and incidental impurities.

In another alternate embodiment wherein the shroud 50 comprises a cobalt-base superalloy, the two alloys in the precursor mixture are described in detail in U.S. Pat. No. 4,842,953, issued on Jun. 27, 1989, and entitled "ABRADABLE ARTICLE AND POWDER AND METHOD FOR MAKING," which is hereby incorporated by reference in its entirety, and which is assigned to the assignee of the present invention, and described in detail in U.S. Pat. No. 4,937,042, issued on Jun. 26, 1990, and entitled "METHOD FOR MAKING AN ABRADABLE ARTICLE," which is hereby incorporated by reference in its entirety, and which is assigned to the assignee of the present invention. Another alternate preferred higher-melting-point alloy component for use with the cobalt-base superalloy embodiment of shroud 50 has a composition comprising, in weight percent, about 16.8 percent to about 32.7 percent nickel, about 21.5 percent to about 24.9 percent chromium, about 8 percent to about 9.9 percent aluminum, about 0.045 percent to about 0.13 percent yttrium, balance cobalt and incidental impurities, and further characterized as having substantially no silicon. Another alternate more preferred higher-melting-point alloy component for use with the cobalt-base superalloy embodiment of shroud 50 has a composition comprising, in weight percent, about 30.5 percent to about 32.5 percent nickel, about 21.5 percent to about 22.5 percent chromium, about 8 percent to about 9 percent aluminum, about 0.045 percent to about 0.095 percent yttrium, up to about 0.5 percent iron, up to about 0.011 percent carbon, up to about 0.005 percent sulfur, up to about 0.010 percent phosphorus, up to about 0.0175 percent oxygen, up to about 0.015 percent nitrogen, balance cobalt and incidental impurities and further characterized as having substantially no silicon. Another alternate preferred lower-melting-point alloy component for use with the cobalt-base superalloy embodiment of shroud 50 has a composition comprising, in weight percent, about 38 percent to about 53.1 percent nickel, about 10 percent to about 30 percent chromium, about 8 percent to about 12 percent silicon, about 1.5 percent to about 4 percent aluminum, balance cobalt and incidental impurities, and further characterized as having substantially no yttrium. Another alternate more preferred lower-melting-point alloy component for use with the cobalt-base superalloy embodiment of shroud 50 has a composition comprising, in weight percent, about 38 percent to about 40 percent nickel, about 21.5 percent to about 22.5 percent chromium, about 3.4 percent to about 4.4 percent aluminum, about 9.8 percent to about 10.2 percent silicon, up to about 0.50 percent iron, up to about 0.011 percent carbon, up to about 0.005 percent sulfur, up to about 0.010 percent phosphorus, up to about 0.0175 percent oxygen, up to about 0.015 percent nitrogen, balance cobalt and incidental impurities, and further characterized as having substantially no yttrium. In an alternate preferred embodiment, the alloy components of the precursor mixture, combined, for use with the cobalt-base superalloy embodiment of shroud 50 comprise, in weight percent, about 50 percent to about 70 percent of the higher-melting-point alloy component and balance the lower-melting-point alloy component.

In another alternate embodiment the alloy components of the precursor mixture, combined, for use with the cobalt-base superalloy embodiment of shroud 50 comprise, in weight percent, about 10 percent to about 35 percent chromium, about 4 percent to about 10 percent aluminum, up to about 0.09 percent yttrium, about 2 percent to about 6 percent silicon, balance cobalt and incidental impurities, the coating further being characterized by the substantial absence of boron.

In one embodiment the next step 120 after providing the precursor mixture 115 is forming the precursor mixture into a thin mildly curved preform that conforms to the shape of the mildly curved pre-repair flowpath surface 74 and has a thickness in the range of about 0.080 inch to about 0.120 inch. The mildly curved preform may be formed by tape casing, pressing, injection molding, or any other operable method. A description of binders used for the pressing process and the pressing process may be found in U.S. Pat. No. 5,705,281, entitled "COATED NICKEL-BASE SUPERALLOY ARTILCE AND POWDER AND METHOD USEFUL IN ITS PREPARATION," which is hereby incorporated by reference in its entirety. It is not necessary that the preform have little porosity as it is later partially densified by brazing, reducing the porosity. For the injection molding method, plastic binders are used. After the mildly curved preform is formed in step 120, the next step 125 is partially densifying the preform by heating the preform in a vacuum furnace at a temperature above the melting point of the lower-melting-point alloy component for a time sufficient to form a partially densified preform. The step of heating 125 takes place when the preform is on a mildly curved plate so that the preform retains its mildly curved shape. The mildly curved plate preferably comprises a material selected from the group consisting of alumina, zirconia, and ceramic felt, although any functional material as known in the art may be used. The partial densification preferably takes place at a temperature below the melting point of the higher-melting-point alloy. The partial densification preferably takes place at a temperature in the range of about 1177° C. (2150° F.) to about 1246° C. (2275° F.) for a time in the range of about 0.25 hours to about 4 hours. The partial densification more preferably takes place at a temperature in the range of about 1232° C. (2250° F.) to about 1243° C. (2270° F.) for a time of about 2 hours.

In an alternate embodiment the next step 130 after the step of providing the precursor mixture 115 is forming a thin flat preform. The flat preform may be formed by tape casing, pressing, injection molding, or any other operable method. It is not necessary that the preform have little porosity as it is later partially densified by brazing, reducing the porosity. For the injection molding method, plastic binders are used.

In this alternate embodiment, after the flat preform is formed in step 130, the next step 135 is partially densifying the preform by heating the preform in a vacuum furnace on a flat plate at a temperature above the melting point of the lower-melting-point alloy component for a time sufficient to form a partially densified preform. The flat plate preferably comprises a material selected from the group consisting of alumina, zirconia, and ceramic felt, although any functional material as known in the art may be used. The partial densification preferably takes place at a temperature below the melting point of the higher-melting-point alloy. The partial densification preferably takes place at a temperature in the range of about 1177° C. (2150° F.) to about 1246° C. (2275° F.) for a time in the range of about 0.25 hours to about 4 hours. The partial densification more preferably takes place at a temperature in the range of about 1232° C. (2250° F.) to about 1243° C. (2270° F.) for a time of about 2 hours.

The next step 140 in this alternate embodiment is forming a mildly curved partially densified preform from the flat densified perform formed in step 135. This may be accomplished by any means known in the art, such as mechanically working the flat partially densified preform.

In either case, once the mildly curved partially densified preform is formed, the next step 145 is applying the restoration. The first step 150 of applying the restoration is attaching the mildly curved partially densified preform to the pre-repair flowpath surface 74 of the shroud 50. The preform may be attached by any means known in the art, such as by weighing down the preform, using an adhesive, or spot welding the preform to the pre-repair flowpath surface 74.

The next step 155 is bonding the partially densified preform to the shroud 50 by heating the preform and the shroud 50 in a vacuum furnace to a temperature in the range of about 1232° C. (2250° F.) to about 1288° C. (2350° F.) for a period of time in the range of about 20 minutes to about 2 hours. The step of bonding 155 preferably takes place at a temperature of from about 1249° C. (2280° F.) to about 1274° C. (2325° F.) for about 2 hours.

Figure 7:
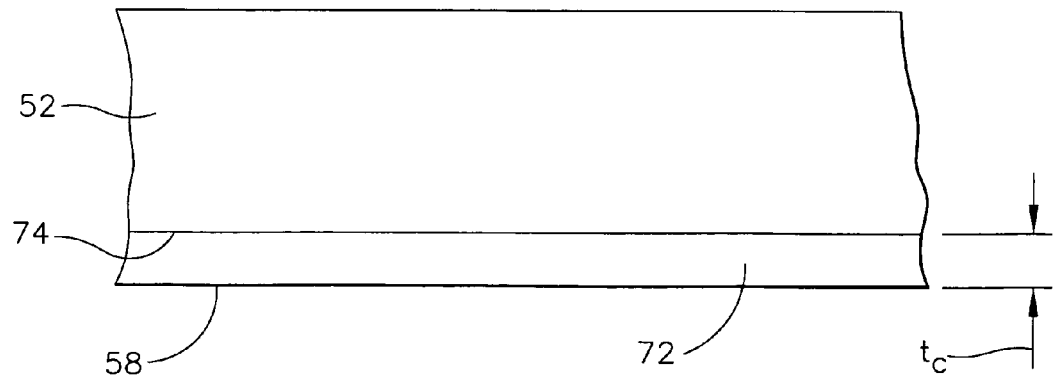
FIG. 7 is an enlarged schematic side elevational view of the gas turbine stationary flowpath shroud during the restoration process.

As shown in FIG. 7, the exposed surface of the coating 72 is the new, repaired flowpath surface 58. The restoration coating 72 may be applied in any operable thickness $t_c$ that returns the dimension of the shroud 50 to its desired values, but is preferably is applied to a thickness of from about 0.080 to about 0.120 inch. The restoration coating although it may be applied in larger or smaller thicknesses, for example from about 0.04 inch to about 0.160 inch. The porosity of the coating is in the range of about 0.3% to about 3.0%.

After processing, the shroud 50 comprises a nickel-base or cobalt base superalloy shroud 50 that has previously been in service, and a restoration partially densified preform applied and diffusion metallurgically bonded to the pre-repair flowpath surface 74 of the shroud segment 52, with the partially densified preform forming a restoration coating 72. The porosity of the restoration coating 72 is preferably in the range of about 0.3 percent to about 3.0 percent.

Optionally, an environmental coating may be applied to protect portions of the shroud as known in the art. The environmental coating is typically a diffusion aluminide applied by vapor phase aluminiding (VPA), a process known in the art. Any portion of the environmental coating that deposits on the flowpath surface 58 is machined away prior to operation of the engine.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for repairing a gas turbine stationary flowpath shroud comprising the steps of:
    providing a superalloy gas turbine stationary flowpath shroud that has previously been in service, wherein the superalloy is selected from the group consisting of nickel-base superalloy and cobalt-base superalloy, the shroud comprising a flowpath surface;
    preparing a restoration coating for application to the flowpath surface of the shroud by the steps of:
        providing a precursor mixture comprising:
            a higher-melting-point alloy component;
            a lower-melting-point alloy component; and
            a fugitive binder; and
        forming a mildly curved restoration preform from the precursor mixture;
        sintering the restoration preform at a preselected sufficiently high temperature to melt the lower-melting-point alloy component for a preselected period of time sufficient to partially densify the restoration preform and burn off the binder, wherein the sintering takes place on a mildly curved plate other than the flowpath surface; and thereafter
    applying the restoration coating to the flowpath surface by the steps of:
        attaching the mildly curved partially densified preform to the flowpath surface; and
        thermally bonding the mildly curved partially densified preform to the flowpath surface by heating the shroud with the partially densified preform for a preselected period of time and at a preselected temperature sufficient to form a metallurgical diffusional bond between the partially densified preform and the flowpath surface thereby forming the restoration coating.

2. The method of claim 1, wherein the superalloy is a nickel-base superalloy.

3. The method of claim 2, wherein the alloy components, in combination, comprise up to about 12 weight percent chromium and up to about 0.01 weight percent yttrium.

4. The method of claim 2, wherein the alloy components, in combination, comprise about 10.2 weight percent chromium, about 5.6 weight percent cobalt, about 7.2 weight percent aluminum, about 4.3 weight percent tantalum, about 1.3 weight percent rhenium, about 3.1 weight percent tungsten, about 0.1 weight percent hafnium, about 2.1 weight percent silicon, substantially no yttrium, and balance nickel and incidental impurities.

5. The method of claim 2, wherein the alloy components, in combination, comprise about 10 weight percent to about 20 weight percent cobalt, about 14 weight percent to about 25 weight percent chromium, about 2 weight percent to about 12 weight percent aluminum, from 0 to about 0.2 weight percent yttrium, about 0.001 weight percent to about 3 weight percent boron, about 1 weight percent to about 10 weight percent silicon, and balance nickel and incidental impurities.

6. The method of claim 1, wherein the superalloy is a cobalt-base superalloy.

7. The method of claim 6, wherein the alloy components, in combination, comprise about 10 weight percent to about 35 weight percent chromium, about 4 weight percent to about 10 weight percent aluminum, up to about 0.09 weight percent yttrium, about 2 weight percent to about 6 weight percent silicon, substantially no boron, and balance cobalt and incidental impurities.

8. The method of claim 1, wherein the step of sintering takes place at a temperature in the range of about 1177° C. to about 1246° C. for a time in the range of about 0.25 hours to about 4 hours.

9. The method of claim 1, wherein the step of thermally bonding takes place at a temperature in the range of about 1232° C. to about 1288° C. for a time in the range of about 20minutes to about 2 hours.

10. The method of claim 1, wherein porosity of the restoration coating is in the range of about 0.3% to about 3.0%.

11. The method of claim 1, wherein the restoration coating has a thickness in the range of about 0.04 inch to about 0.160 inch.

12. A method for repairing a gas turbine stationary flowpath shroud comprising the steps of:
    providing a superalloy gas turbine stationary flowpath shroud that has previously been in service, wherein the superalloy is selected from the group consisting of nickel-base superalloy and cobalt-base superalloy, the shroud comprising a flowpath surface;
    preparing a restoration coating for application to the flowpath surface of the shroud by the steps of:

providing a precursor mixture comprising;
  a higher-melting-point alloy component;
  a lower-melting-point alloy component; and
  a fugitive binder; and
forming a flat restoration preform from the precursor mixture;
sintering the restoration preform at a preselected sufficiently high temperature to melt the lower-melting-point alloy component for a preselected period of time sufficient to partially densify the restoration preform and burn off the binder, wherein the sintering takes place on a flat plate;
forming a mildly curved partially densified preform from the flat partially densified preform by mechanical working; and thereafter applying the restoration coating to the flowpath surface by the steps of:
attaching the mildly curved partially densified preform to the flowpath surface; and
thermally bonding the mildly curved partially densified preform to the flowpath surface by heating the shroud with the partially densified preform for a preselected period of time and at a preselected temperature sufficient to form a metallurgical diffusional bond between the partially densified preform and the flowpath surface thereby forming the restoration coating.

13. The method of claim 12, wherein the superalloy is a nickel-base superalloy.

14. The method of claim 13, wherein the alloy components, in combination, comprise up to about 12 weight percent chromium and up to about 0.01 weight percent yttrium.

15. The method of claim 13, wherein the alloy components, in combination, comprise about 10.2 weight percent chromium, about 5.6 weight percent cobalt, about 7.2 weight percent aluminum, about 4.3 weight percent tantalum, about 1.3 weight percent rhenium, about 3.1 weight percent tungsten, about 0.1 weight percent hafnium, about 2.1 weight percent silicon, substantially no yttrium, and balance nickel and incidental impurities.

16. The method of claim 13, wherein the alloy components, in combination, comprise about 10 weight percent to about 20 weight percent cobalt, about 14 weight percent to about 25 weight percent chromium, about 2 weight percent to about 12 weight percent aluminum, from 0 to about 0.2 weight percent yttrium, about 0.001 weight percent to about 3 weight percent boron, about 1 weight percent to about 10 weight percent silicon, and balance nickel and incidental impurities.

17. The method of claim 12, wherein the superalloy is a cobalt-base superalloy.

18. The method of claim 17, wherein the alloy components, in combination, comprise about 10 weight percent to about 35 weight percent chromium, about 4 weight percent to about 10 weight percent aluminum, up to about 0.09 weight percent yttrium, about 2 weight percent to about 6 weight percent silicon, substantially no boron, and balance cobalt and incidental impurities.

19. The method of claim 12, wherein the step of sintering takes place at a temperature in the range of about 1177° C. to about 1246° C. for a time in the range of about 0.25 hours to about 4 hours.

20. The method of claim 12, wherein the step of thermally bonding takes place at a temperature in the range of about 1232° C. to about 1288° C. for a time in the range of about 20 minutes to about 2 hours.

\* \* \* \* \*